United States Patent
Sturm

[11] 3,890,510
[45] June 17, 1975

[54] APPARATUS FOR CONTROLLING THE ABSORPTION OF DYE COMPONENTS IN A FLUID

[75] Inventor: Walter H. Sturm, Hanau-Hohe Tanne, Germany

[73] Assignee: Original Hanau Quarzlampen GmbH, Hanau, Germany

[22] Filed: Nov. 30, 1973

[21] Appl. No.: 420,485

[30] Foreign Application Priority Data
Dec. 13, 1972 Germany.......................... 2260906

[52] U.S. Cl................................ 250/565; 356/205
[51] Int. Cl. .......................................... G01n 21/26
[58] Field of Search .......... 250/564, 565, 273, 274, 250/275, 214; 356/204, 205, 206

[56] References Cited
UNITED STATES PATENTS

| | | | |
|---|---|---|---|
| 3,504,185 | 3/1970 | Zweig ................. | 250/565 |
| 3,522,739 | 8/1970 | Coor .................. | 250/564 |
| 3,566,133 | 2/1971 | Dorman ............... | 250/214 |
| 3,662,176 | 5/1972 | Kamentsky ............ | 250/565 |
| 3,703,336 | 11/1972 | Rosse ................ | 356/205 |
| 3,743,429 | 7/1973 | Kawai ................ | 356/204 |
| 3,796,887 | 3/1974 | Vincent .............. | 250/565 |

Primary Examiner—James W. Lawrence
Assistant Examiner—D. C. Nelms
Attorney, Agent, or Firm—Sughrue, Rothwell, Mion, Zinn and Macpeak

[57] ABSTRACT

A light source-photocell arrangement senses the transparency of the dye fluid in a textile dying vat. The photocell output is coupled through a logarythmic amplifier to a sampled signal storage unit and to a voltage divider. The storage unit and voltage divider outputs are supplied to a comparator whose delayed output controls a relay that regulates the temperature of the dying vat. In operation, the vat temperature is increased until a level is reached for the optimum absorption of a first dye component. This level is sensed by a decrease in the dye fluid transparency, and the circuitry thereafter hunts the temperature about this level until the transparency becomes constant which indicates the complete absorption of the first component. The temperature is thereafter increased until a higher level is reached at which a second dye component is optimally absorbed, as sensed by a further decrease in the dye fluid transparency, and the process thus continues until all of the dye components have been absorbed.

7 Claims, 1 Drawing Figure

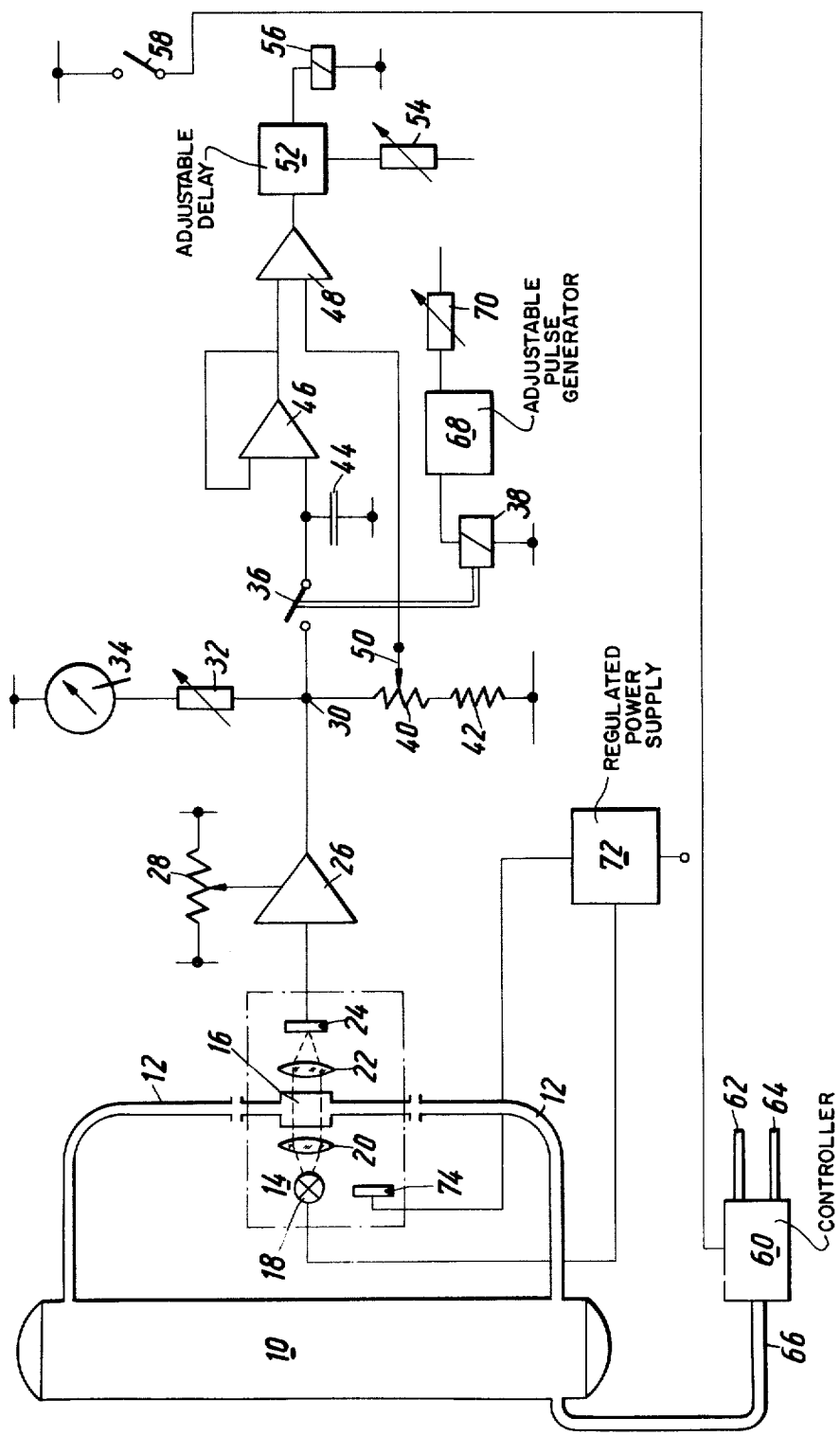

APPARATUS FOR CONTROLLING THE ABSORPTION OF DYE COMPONENTS IN A FLUID

BACKGROUND OF THE INVENTION

1. Field of the Invention

The invention relates to an apparatus for controlling the absorption of one or more dye components contained in a dye fluid by regulating the temperature of the fluid as a function of its transparency. The temperature is raised to an optimum value for the absorption of the component concerned and afterwards maintained at an almost constant value until the completion of the absorption as determined by the retrogression of the change of transparency.

2. Description of the Prior Art

A known apparatus for the absorption of color components of a dye fluid on textile goods is fitted with a shunt-conduit having a transparent sector through which a light beam penetrates the dye fluid. The light beam is directed at a photoelectric cell, the output signal of which represents the transparency of the dye fluid. The photocell output is supplied to a controlling device which produces a constant dyeing temperature by heating the dye container when a change in the transparency of the dye fluid occurs. When a constant transparency is detected, the control device then increases the temperature of the dye fluid until a new change in the transparency of the dye fluid occurs. This process is repeated until all components of the dye fluid have been absorbed. A limiting value of the transparency serves as an indication that all dye components have been absorbed. (German Offenlegungsschrift 2,112,014).

SUMMARY OF THE INVENTION

It is an object of this invention to further develop an apparatus of the above mentioned type so that it can be easily mounted and can be adapted quickly and without complicated manipulation to dye fluids and dye containers of different types as well as to their heating elements.

According to the invention this object is achieved in that the output of a photocell illuminated by a light beam penetrating the dye fluid is connected through a scanning or sampling switch and an analog electrical storing unit to the input of a comparator, the second input of which is connected with the photocell through a voltage-divider. The comparator output is connected to a final control device for regulating the temperature of the dye fluid.

The apparatus comprises a plurality of electrical components, mostly without contacts, and is characterized by high reliability and long durability. It has no expensive and no adjusting elements working mechanically, and even slight changes in the transparency of the dye fluid can be detected. The self-acting determination of the temperature suitable for the optimum speed of absorption is therefore performed with great accuracy.

In a preferred embodiment, a logarithmic amplifier is supplied with the photocell output, the characteristic curve of the output voltage of said amplifier being adjustable to selected values of the transparency to which defined limits of the absorption process are coordinated.

With this assembly, the limiting values of the transparency of the dye fluid used, which should be available at the beginning and at the end of the dyeing, can be adjusted at the amplifier. The assembly can be controlled by means of an ammeter in the output circuit of the logarithmic amplifier. The ammeter can also be used to control the assembly during the dyeing process. The concentration of the absorbing material contained in a solution, that is to say of a dye component, is proportional to the logarithm of the reciprocal transparency. The characteristic curve of the output signal of the logarithmic amplifier makes a linear plot available between the concentration and the transparency. This facilitates the establishment and reading of the scale of the ammeter which, for instance, can be calibrated in percentage values of the concentration. Furthermore, the linear signal changes at the output of the logarithmic amplifier enable the use of more simplified control elements in the subsequent circuitry.

In a preferred embodiment, the ratio of the voltage-divider circuit is adjustable.

When the scanning switch is closed, a voltage corresponding to the output voltage of the logarithmic amplifier is applied to one input of the comparator, whereas a voltage reduced by the ratio of the voltage divider is applied to the other input. After the opening of the scanning switch the voltage at the output of the analog storing unit remains constant. The voltage at the second input rises as a result of the increase of the transparency. As soon as the comparator detects the conformity of the voltages at its inputs, it issues a sign· in the form of a sudden change in voltage at its out,.ut. The moment of this sudden change in voltage depends, in an absorption process, on the importance of the change of the transparency and the adjustment of the ratio of the voltage divider. The sudden change in voltage can cause, for instance, the switching off of the heating circuit and the switching on of the coolant circuit at the dye container. By means of the adjustment of the voltage divider ratio the heating and cooling periods can be selected in such a way that the temperature in the dye container remains approximately constant during an absorption process. By means of the adjustable voltage divider ratio, the specific embodiment according to the invention can be adjusted for the regulation of the temperature under different conditions which are given, for instance, on the basis of different time constants for the heating up and cooling of the dye containers, on the basis of different temperatures for selected dye components, on the basis of different heating of the dye containers, or on the basis of different temperatures of the means of heating or cooling available.

In a preferred embodiment the frequency of closure of the scanning or sampling switch is adjustable.

By adjusting the scanning frequency the assembly can be adapted to the conditions prevailing for a certain dye container. Dye containers have a certain dead time with regard to temperature regulation, i.e. a certain time elapses, depending on the construction and the heating and cooling system of the container, until the temperature begins to react to a sudden change of the heating or cooling inflow. By adjusting the scanning frequency, the apparatus can be optimally adapted to the conditions set in advance by the dye container and the dye fluid, that a definite deviation control of the temperature can be attained with a minimum of keying or temperature hunting cycles.

Another feature is that a signal delay switching circuit with an adjustable delay action is connected between the output side of the comparator and a relay through which a heating and/or cooling circuit to a dye container is controllable by means of valves. This facilitates the adaptation of the device to the conditions on hand of a certain dye container as far as heating and cooling time are concerned.

BRIEF DESCRIPTION OF THE DRAWINGS

In the drawing, the single FIGURE shows a schematic block diagram of a control apparatus for dye absorption according to the invention.

DESCRIPTION OF THE PREFERRED EMBODIMENT

The FIGURE shows schematically the structure of an apparatus for the control of the absorption of dye components of a dye fluid on textile goods which are placed in a dye container 10 filled with dye fluid. The dye container 10 is provided with a shunt-conduit 12 which is connected to measuring head 14. The conduit disposed in the measuring head 14 contains a transparent section 16.

In the measuring head 14 there is a light source 18, the radiation of which passes through a lens 20 whose parallel beam output penetrates the transparent section 16 and the part of the dye fluid contained therein. The emerging light beam of the transparent section 16 is directed to a photocell 24 by means of another lens 22. Dye fluid flows through the conduit 12 as a result of the pressure differences at the upper and lower end of the container 10. The pressure differences adjust themselves as a result of the reserve pumping of the dye fluid in the container 10. In order to maintain a sufficient velocity of flow, a pump, not shown in the FIGURE, can also be placed in the conduit 12.

The photocell 24 is connected to a logarithmic amplifier 26. Due to the logarithmic dependence of the output signals of the photocell 24 on the dye fluid concentration, the amplifier 26 supplies at its output a characteristic curve, running linearly, of the output voltage as a function of the concentration. By means of a potentiometer 28, which is connected with the internal circuit of the amplifier, not represented in the drawing, the starting point of the output characteristic curve can be selectively set. It is thus possible to coordinate an initial concentration to a certain transparency of the dye fluid.

The output 30 of the amplifier 26 is connected by means of a potentiometer 32 and an ammeter 34 with a reference potential, for instance ground. By the potentiometer 32, the end point of the characteristic curve of the output signal can be adjusted. A certain maximum transparency is coordinated to this end point, this transparency obtaining after the absorption of all the dye components of the dye fluid. The adjustment of the initial and end point of the characteristic curve can be controlled by means of the ammeter 34 which can be calibrated in percentage values of the separation. As an end point of the characteristic curve of the amplifier 26, the transition of the saturation, for instance, can be used. It is possible to control the end point by means of an adjustable threshold circuit, in order to indicate the end of the dyeing process and to switch off the temperature controls of the container 10.

The output 30 of the amplifier 26 is also connected to a scanning switch 36 operated by a relay 38, and to a voltage divider composed of a potentiometer 40 and a resistance 42, the second junction of the latter being connected to a reference potential, for instance ground.

The scanning switch 36 is connected to a condensor 44, the other side of which is grounded. Furthermore, the scanning switch 36 is connected to an operational amplifier 46 which has a voltage amplifying factor of one. The output of the operational amplifier 46 is fed back as the second input of the amplifier. The condensor 44 and the operational amplifier 46 constitutes an analog electric storage unit which at its output supplies a signal corresponding to the voltage on the condensor 44, even when the switch 36 is open. The operational amplifier 46 prevents an undesirable unloading of the condensor 44. As soon as the switch 36 is closed, the condensor 44 charges to the voltage existing at the output 30. The output of the operational amplifier 46 is connected with one input of a comparator 48. The second input of the comparator 48 is connected to the pick-up 50 of the potentiometer 40. The output of the comparator 48 feeds a circuit 52 with which a delay of a supplied signal can be produced. The extent of the delay time can be adjusted by means of a potentiometer 54.

The output of the signal delay control 52 is connected to a relay 56 which operates a current contact 58 to control an arrangement 60 containing valves, not shown, which are disposed in the heating and cooling conducts 62, 64. From the conducts 62, 64 the heating and cooling agents are led to a conduct 66, which is connected to the container 10.

The relay 38 is fed by a pulse generator 68 whose frequency can be adjusted by means of a potentiometer 70. The pulses produced by the generator 68 have a small duration compared with the pulse interval. The duration ratio of pulse to pulse interval can be, if needed, adjusted to the prevailing requirements by adequate changes of the parameter control of the generator 68.

The light source 18 is supplied with energy by a power-supply unit 72. In the measuring head 14 another photocell 74 can be disposed, which receives light from the light source 18. It is advantageous to connect the photocell 74 to a control circuit, not shown, which is in the power-supply unit 72 and which regulates the radiation emanating from the light source 18 to a constant brightness. Thereby, brightness changes of the light source 18 are avoided in the case of fluctuations in the alternating current or the aging of the lamp. This arrangement thus improves the reproducibility of the dyeing process.

Prior to the beginning of a dyeing process, the characteristic curve of the amplifier 26 is adjusted to the values of the transparency of the dye fluid characterizing the start and the end of the dyeing process. Since at the beginning of a dyeing process the dye components are dissolved for the most part in the dye fluid, a slight transparency prevails, so that the amplifier 26 supplies a small output signal. When the switch 36 closes, this signal is stored on the condensor 44. The signal from the condensor 44 through the operational amplifier 46 to an input of the comparator 48 is greater than the signal occurring at the pick-up 50. The operational amplifier 46 generates therefore a voltage with a high level, which pulls up the relay 56 through the circuit 52. As a result of the pulling-up the relay 56, the heating circuit of the container 10 is switched on by the circuit 60. As long as the transparency of the dye fluid does not change or only slightly changes, the relay 56 remains energized after each scanning pluse. Thereby heating agents are continuously supplied to the container 10, so that its temperature rises.

At a certain temperature, which is characteristic for a given dye, the absorption process runs off with optimal speed. During the absorption of a dye component on the textile good the concentration of the dye decreases. This results in an increase in the transparency of the dye fluid. Therefore, as soon as the most favorable temperature for the absorption of a dye component has been reached, the transparency shows its greatest change with respect to time. Due to this change the output voltage of the amplifier 26 increases. As a result, between two consecutive scanning pulses, the voltage tapped off from the potentiometer 40 exceeds the voltage at the condensor 44 and, present at the output of the operational amplifier 46. At this time the output voltage of the comparator 48 suddenly changes its level. After a given delay effected by the circuit 52 the relay 56 is thus de-energized and thereby interrupts the heating agent flow to the container 10 and switches on the cooling agent flow. Thus, further heating of the container 10 interrupted. On account of the thermic time constant of the unit consisting of the container 10 and the heating and cooling system, the temperature begins to flatten and finally drops. The range of temperature determined for the optimum dye absorption remains almost unchanged. This means a further decrease in the transparency of the dye fluid.

At the next scanning impulse an appropriately higher voltage reaches the condensor 44. Since the voltage at the pick-up 50 is lower by as much as the voltage divider ratio than the voltage at the output 30, the comparator 48 returns back to its high output level, which, after a delay by the circuit 52, causes the relay 56 to pull-up, which switches on again the heating for the container 10. The temperature in the container 10 drops afterwards more slowly and finally rises again. On account of the insignificant temperature fluctuations, the absorption process of the dye component continues with an accordingly great fluctuation of the transparency. As a result of the voltage increase at the output 30, the voltage at the pick-up 50 once more exceeds the voltage stored at the condensor 44, so that, at the output of the comparator 48, a voltage drop occurs which is followed by a further switching off of the heating and the switching on of the cooling system at the container 10. During the strong change of the transparency of the dye fluid, regulation of the temperature of the dye fluid in the container 10 follows thereupon. This regulation shows a two-position action. By means of an adequate adjustment of the pick-up 50 the time of the switching of the comparator 48 can be influenced. The arrangement represented in the drawing can be adapted by means of the potentiometer 40 to various conditions with regard to the extent of the change of the transparency increase, as well as to the time constants of the container 10, including the goods to be dyed and the heating and cooling system.

When the transparency has attained a constant value, which indicates the full absorption of a dye component, the voltage at the output of the amplifier 46 exceeds the voltage at the pick-up 50 between two consecutive scanning pulses. Hence, the heating of the container 10 remains switched on and the temperature of the dye fluid rises until an optimum temperature for the absorption of a further dye component has been reached. Thereafter the temperature is maintained at the new level until a constant transparency indicates that the next dye component has been absorbed by the textile material.

The arrangement according to the drawing performs as many cycles of the temperature raise with following regulation to a constant temperature value as there are dye components with characteristic temperature values for an optimum absorption. The occurance of a maximum transparency of the dye fluid, which is preset in the amplifier 26, serves as a signal that all the dye components are absorbed. The dye container 10 can afterwards be put out of service and cleaned. It is then available for a new dyeing process.

Thermic time constants and dead time differences result from different embodiments of dye containers and heating or cooling systems. By changing the frequency of the pulse generator 68 the arrangement represented in the drawing can be adapted to the optimum conditions arising in the case of dye containers, different in construction and in size, in the sense that a good regulation of the temperature can be attained with a minimum of keying or hunting cycles.

By adjusting the time log with the help of the signal delay circuit 52 the arrangement can be adapted to the conditions of various containers 10. The overswing of the temperature can be kept within the desired limits by means of the signal delay circuit 52.

What is claimed is:

1. In an apparatus for controlling the absorption of one or more dye components contained in a dye fluid by regulating the temperature of the dye fluid depending on the transparency of the dye fluid, whereby the temperature of the dye fluid is raised to an optimum value for the absorption of a dye component as indicated by a detected change in transparency of the dye fluid and afterwards the temperature of the dye fluid is maintained at an almost constant value until the completion of the dye component absorption as indicated by a constant transparency being detected and thereafter the temperature of the dye fluid is raised to a new optimum value for the absorption of another dye component as indicated by a newly detected change in transparency of the dye fluid until all components of the dye fluid have been absorbed, said apparatus including a dye fluid container, a measuring head for measuring the transparency of the dye fluid, a shunt conduit for recirculating the dye fluid in the dye fluid container through the measuring head, and means for heating the dye fluid in the container, the improvement comprising:

a scanning circuit connected to receive a signal proportional to the transparency of the dye fluid from said measuring head, and periodically sampling said measuring head signal, a storing circuit connected to said scanning circuit for storing samples of said measuring head signal, a comparator having one input connected to said storing circuit, a voltage divider circuit connected to receive said measuring head signal, said voltage divider circuit having an output directly connected to a second input of said comparator, and a regulating means connected to receive the output of said comparator for controlling said dye fluid heating means to increase the temperature of the dye fluid when the output of said voltage divider circuit is less than the output of said storing circuit and maintaining the temperature of the dye fluid almost constant when the output said voltage divider circuit is greater than the output of said storing circuit.

2. The improvement according to claim 1, further comprising a logarithmic amplifier connected between said measuring head and both of said scanning and voltage divider circuits, the characteristic curve of the output voltage of said logarithmic amplifier being adjustable to selected values of the transparency of the dye fluid, to which predetermined limits of the absorption process are coordinated.

3. The improvement according to claim 1, wherein the ratio of the voltage divider circuit is adjustable, whereby the heating and cooling periods of the dye fluid can be selected in such a way that the temperature in a specific dye container remains approximately constant during an absorption process.

4. The improvement according to claim 1, wherein the frequency of the sampling operation of the scanning circuit is adjustable, whereby said apparatus can be optionally adapted to the specific conditions of said dye container and the dye fluid so that a definite deviation control of the temperature of the dye fluid can be attained with a minimum of scanning or temperature hunting cycles.

5. The improvement according to claim 1, further comprising an adjustable signal delay circuit connected to the comparator output, and wherein said regulating means includes a relay connected to the delay circuit output for controlling values of said dye fluid heating means, said adjustable delay circuit facilitating the adaption of said improvement to the heating and cooling times of a specific dye container.

6. In an apparatus for controlling the absorption of one or more dye components contained in a dye fluid by regulating the temperature of the dye fluid depending on the transparency of the dye fluid, whereby the temperature of the dye fluid is raised to an optimum value for the absorption of dye component as indicated by a detected change in transparency of the dye fluid and afterwards the temperature of the dye fluid is maintained at a constant value until the completion of the dye component absorption as indicated by a constant transparency being detected and thereafter the temperature of the dye fluid is raised to a new optimum value for the absorption of another dye component as indicated by a newly detected change in transparency of the dye fluid until all components of the dye fluid have been absorbed, said apparatus including a dye fluid container, a measuring head for measuring the transparency of the dye fluid, a shunt conduit for recirculating the dye fluid in the dye fluid container through the measuring head, and means for heating the dye fluid in the container, the improvement comprising:

a logarithmic amplifier connected to the output of said measuring head, the characteristic curve of the output voltage of said logarithmic amplifier being adjustable to selected values of the transparency of the dye fluid, to which predetermined limits of the absorption process are coordinated, a scanning circuit connected to said logarithmic amplifier and periodically sampling the output voltage of said logarithmic amplifier, the frequency of the sampling operation of the scanning circuit being adjustable so that a definite deviation control of the temperature of the dye fluid can be attained with a minimum of scanning cycles, a voltage divider connected to the output of said logarithmic amplifier, the ratio of said voltage divider being adjustable so that the heating and cooling periods of the dye fluid can be selected in such a way that the temperature in a specific dye container remains approximately constant during an absorption process, a comparator having first and second inputs, said first input being connected to said storing circuit and said second input being connected to said voltage divider, and a regulating means connected to receive the output of said comparator for controlling said dye fluid heating means to increase the temperature of the dye fluid when the output of said voltage divider is less than the output of said storing circuit and maintaining the temperature of the dye fluid almost constant when the output of said voltage divider is greater than the output of said storing circuit.

7. The improvement according to claim 6 further comprising an adjustable signal delay circuit connected between said comparator output and said regulating means permitting an adjustment of the control of said dye fluid heating means according to the characteristics of a specific container.

* * * * *